May 19, 1959     H. A. COTESWORTH     2,887,067
OVERHEAD MONORAIL SYSTEM
Filed Feb. 27, 1956     2 Sheets-Sheet 1

INVENTOR.
HARRY A. COTESWORTH
BY Hudson, Boughton,
Williams, David & Hoffmann
ATTORNEYS May 19, 1959
H. A. COTESWORTH
2,887,067
OVERHEAD MONORAIL SYSTEM
Filed Feb. 27, 1956
2 Sheets-Sheet 2
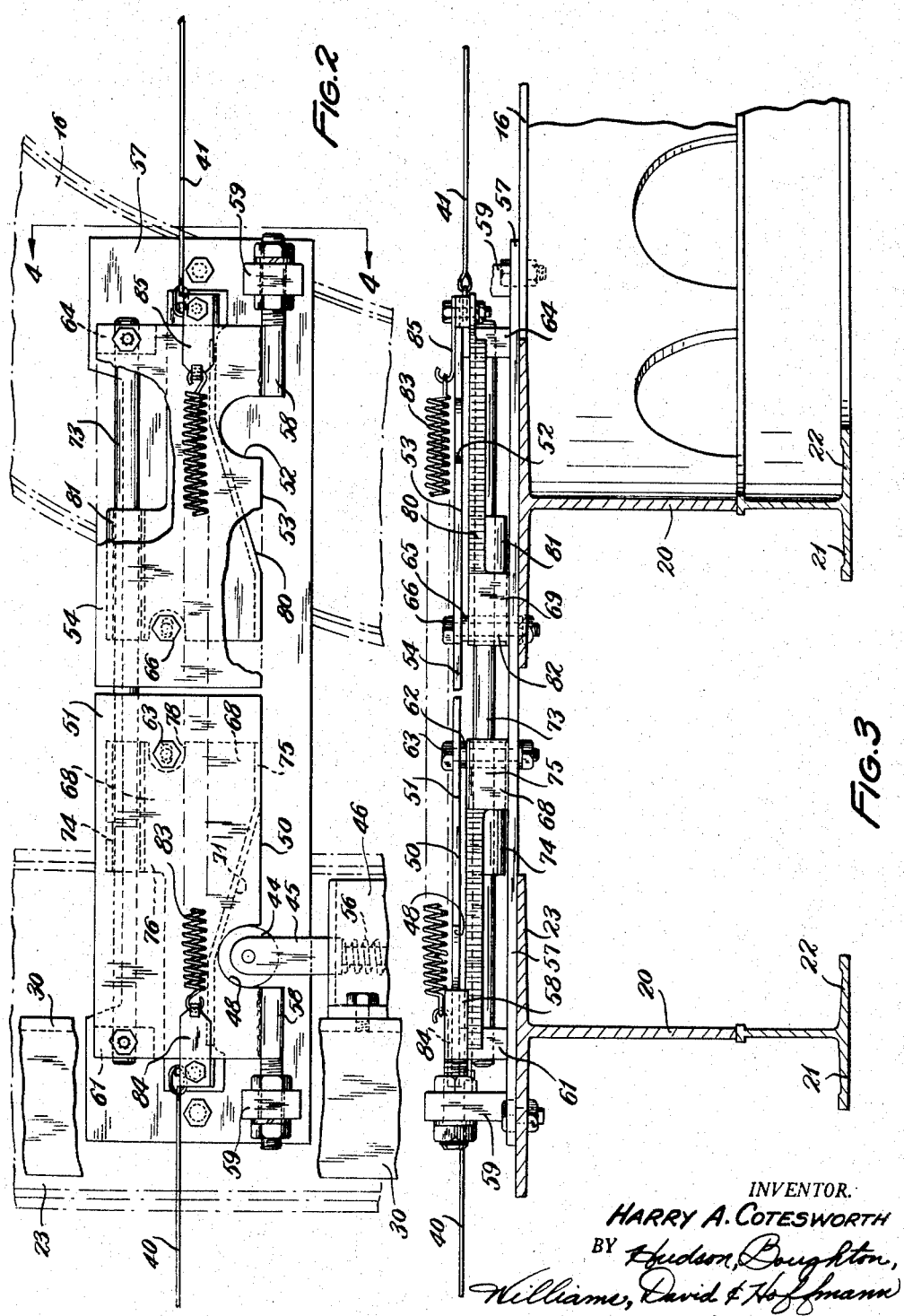
INVENTOR.
HARRY A. COTESWORTH
BY Hudson, Boughton,
Williams, David & Hoffmann
ATTORNEYS

United States Patent Office 2,887,067
Patented May 19, 1959

2,887,067

OVERHEAD MONORAIL SYSTEM

Harry A. Cotesworth, Cleveland Heights, Ohio, assignor to The Cleveland Crane & Engineering Company, Wickliffe, Ohio, a corporation of Ohio Application February 27, 1956, Serial No. 567,821

5 Claims. (Cl. 104—102)

The present invention relates to overhead monorail carrier systems and, more particularly, to such a system having a track switch therein for selectively causing a carrier which is traveling on a trackway entering the switch to take any one of a plurality of trackways exiting from the switch.

The principal object of the present invention is to provide a new and improved overhead monorail system having a track switch shiftable to any one of a plurality of operative positions to select which one of a plurality of trackways leading from the switch that a carrier, traveling on an entering trackway to the switch, will take, the track switch including releasable latching means for securely holding the track switch in the desired operative position and force transmitting members, such as chains or flexible cables, for shifting the track switch between its operative positions, and being so constructed and arranged that it is readily and easily shiftable between its various operative positions with a minimum force applied to and with minimum danger of fouling the force-transmitting members.

Another object of the present invention is to provide a new and improved track switch for use in rail systems, particularly an overhead monorail system, which track switch includes a movable frame which is shiftable in an endwise direction between at least two operative positions by means of pull chain cable or similar flexible member to selectively form a continuous trackway between an entering trackway to the switch and any one of at least two trackways leading from the switch and which is held in its selected operative position by releasable latching means, the track switch being so constructed and arranged that when a force is applied to a flexible member to shift the switch from its immediate position to another position, the initial movement of the flexible member actuates a sliding cam member for releasing the latching means holding the frame in its immediate position, the cam member preferably moving linearly in its latch releasing direction along a line parallel to the force applied thereto whereby the force tending to shift the cam member is substantially equal to the force being applied to the pull chain or cable, and the danger of fouling the pull chain or cable is minimized.

A further object of the present invention is to provide a track switch for use in a rail system, particularly an overhead monorail system, having a movable frame which is shiftable by pull chains, cables, or similar flexible members in endwise directions between two operative positions for selectively connecting an entering trackway to the switch with either one of two trackways leading from the switch, and which is held in its operative position by a latch member movable to its latching position upon the movement of the frame to any one of its operative positions, the track switch being so constructed and arranged that when one of the flexible members is pulled to shift the track switch from its immediate position to its other position, the full force applied to the pull chain or cable is applied to a linearly movable cam member having a cam surface individual to the immediate position for releasing the latch holding the track switch in its immediate position, whereby the track switch is readily shiftable with a minimum of force and with little danger of fouling the pull chains or cables.

The invention resides in certain constructions, combinations and arrangements of parts, and further objects and advantages will be apparent to those skilled in the art to which it relates from the following description of the preferred embodiment described with reference to the accompanying drawings forming a part of this specification, in which:

Fig. 2 is an enlarged fragmentary plan view of the track switch shown in Fig. 1;

Fig. 3 is a front elevational view of the portion of the track switch shown in Fig. 2;

Figure 1:
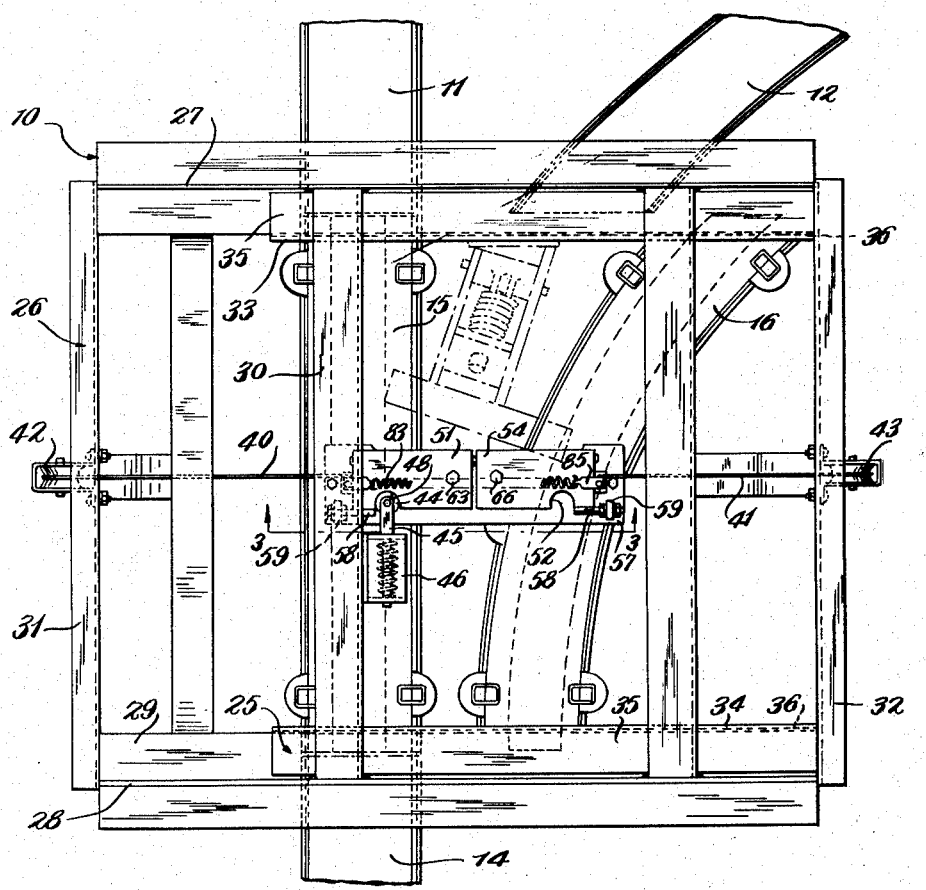
Fig. 1 is a fragmentary plan view of an overhead monorail system embodying the present invention and showing one of the track switches therein.
Figure 5:
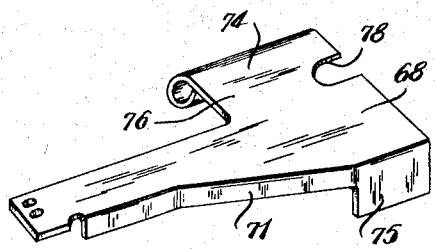
Fig. 5 is a perspective view of a cam member embodied in the track switch shown in Fig. 1.
Figure 4:
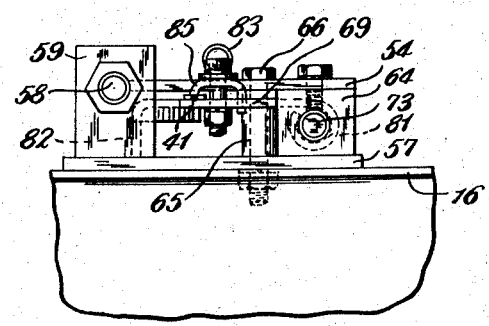
Fig. 4 is an end view of the portion of the track switch shown in Fig. 2.

In the overhead monorail system shown in the drawings, a track switch 10 may be shifted to either one of two operative positions to determine which one of two exit trackways 11, 12, leading from the track switch, that an overhead monorail carrier, traveling on an entering trackway 14 to the switch, will take. The exit trackways 11, 12 terminate short of the trackway 14, and the track switch 10 includes two overhead monorail sections 15, 16, each of which may be selectively registered or aligned with the entering trackway 14 and a respective one of the exit trackways 11, 12 to provide a continuous path between the entering trackway and one of the exit trackways. In the illustrated embodiment, the monorail section 15 is moved into a position interconnecting the entering trackway 14 and the exit trackway 11 when the track switch is in one operative position and the monorail section 16 is in a position interconnecting the entering trackway 14 and the exit trackway 12 when the track switch is in its other operative position. The entering trackway 14 and the exit trackway 11 are in alignment with each other and, therefore, the rail section 15 is a straight section. The exit trackway 12, however, diverges at an angle of approximately 45 degrees from the entering trackway 14 and the rail section 16 is, therefore, a curved section.

The trackways 11, 12, 14 and the rail sections 15, 16 are of conventional monorail construction and will not, therefore, be described in detail. Suffice it to say, that each includes a rail member having a web 20 terminating at its lower edge in horizontal flange portions 21, 22 which respectively extend from the opposite sides of the web and are adapted to support the wheels of the overhead monorail carrier. At its upper edge the web 20 terminates in upper horizontal flange portions 23.

The rail sections 15, 16 constitute part of an inner frame assembly which is supported for endwise shifting movement by an outer frame assembly 26 to permit the rail sections 15, 16 to be selectively shifted into alignment with the entering trackway 14. The outer frame assembly 26 is supported in any conventional manner above the trackways 11, 12, 14 and comprises spaced horizontal T-shaped members 27, 28 extending transversely of the trackways 11, 12, 14. The T-shaped members 27, 28 have lower inwardly extending horizontal flange portions 29 for supporting the inner frame assembly 25. Two spaced transverse frame members 30 are connected between the upper edges of the T-shaped members 27, 28 intermediate the ends thereof to provide a rigid outer frame assembly, and the corresponding opposite ends of the members 27, 28 are bridged by end plates 31, 32, respectively.

In addition to the rail sections 15, 16, the inner frame assembly comprises L-shaped members 33, 34 disposed parallel and adjacent to the T-shaped members 27, 28, respectively. Each of the L-shaped members 33, 34 have a horizontal portion 35 overlying the flange portion 29 of the adjacent T-shaped member and a depending leg portion 36 welded, or otherwise secured, to the upper flange portions 23 of the rail sections 15, 16. The rail sections 15, 16 provide transverse members for interconnecting the longitudinal members 33, 34 of the inner frame assembly 25. Any suitable antifriction means may be provided between the horizontal portions 35 of the members 33, 34 and the adjacent horizontal flange portions 29 of the T-shaped members 27, 28 to facilitate the shifting of the inner frame assembly 25 with respect to the outer frame assembly 26.

In the illustrated embodiment, the inner frame assembly 25 is shifted with respect to the outer frame assembly 26 by means of flexible force-transmitting or pull members 40, 41, such as pull chains or cables 40, 41. The flexible pull member 40 is operated to shift the inner frame assembly 25 to the left, as viewed in the drawings, and passes over a sheave 42 mounted on the end plate 31 while the flexible pull member 41 passes over a sheave 43 mounted on the end plate 32 and is operable to shift the inner frame assembly 25 to the right.

In accordance with the present invention, a latching mechanism is provided for securely holding the inner frame assembly 25 in either one of its operative positions and is engageable upon movement of the inner frame assembly to the operative position. The preferred and illustrated form of the latching mechanism comprises a latch member or roller 44 supported for movement along a line transversely of the line of movement of the inner frame assembly 25. The roller 44 is fixed to the outer end of a plunger 45 supported for axial movement by a housing 46 mounted on the transverse frame member 30 positioned above the entering trackway 14 and the exit trackway 11. When the inner frame assembly 25 is in its operative position where the rail section 15 forms a continuous trackway between the entering trackway 14 and the exit trackway 11, the roller 44 is received in a recess 48 opening into the forward edge 50 of a horizontal latch plate 51 and when the inner frame assembly is shifted so that the rail section 16 is in alignment with the entering trackway 14, the roller 44 is received in a recess 52 opening into the forward edge 53 of a second horizontal latch plate 54. The latch plates 51, 54 are positioned in end-to-end relationship and their forward longitudinal edges 50, 53 are collinear and extend parallel to the line of shifting movement of the inner frame assembly 25. The roller 44, when not received by one of the recesses 48, 52, rides on the forward edges 50, 53 and is yieldably urged into engagement with the edges 50, 53 or into the recesses 48, 52 by a spring 56 positioned coaxially about the plunger 45 within the housing 46.

The latch plates 51, 54 are supported on a plate member 57 which extends between and is fastened to the upper flange portions 23 of the rail sections 15, 16. The latch plates 51, 54 are connected to the plate member 57 for adjustment with respect thereto by threaded rods 58 respectively secured to the forward edge of each of the latch plates 51, 54 outwardly of the recess therein. The rods 58 extend outwardly from the outer end of their respective latch plates and pass through ears 59 extending upwardly from the plate member 57. The rods 58 are threaded and each rod is clamped to its respective ear 59 by nuts which are positioned on opposite sides of the ear.

Furthermore, the latch plate 51 is supported on the plate member 57 at its left rear corner, as viewed in Fig. 2, by a block 61 mounted on the plate member 57, and at its inner or right-hand end by a sleeve 62. A bolt 63 passes through the latch plate, the sleeve 62 and the plate member 57. The right-hand rear corner of the latch plate 54 is similarly supported by a block 64 which spaces the latch plate from the plate member while the left-hand or inner end of the latch plate 54 is supported in spaced relationship to the plate member 57 by a sleeve 65. A bolt 66 passes through the latch plate 54, the sleeve 65 and the plate member 57.

When the roller 44 is positioned in one of the recesses 48, 52 the inner frame assembly cannot move and to shift the inner frame assembly to its other operative position, it is necessary to disengage the roller 44 from the recess in which it is positioned. To this end, cam members 68, 69 are positioned intermediate the latch plates 51, 54, respectively, and the plate member 57 and are operable to respectively disengage the roller 44 from the recesses 48, 52. The cam members 68, 69 are plate-like members which extend generally horizontally and each has its forward edge, which edges are adjacent to the forward edges 50, 53, respectively, of the latch plates 51, 54, formed to provide a cam surface for disengaging the roller 44. The cam member 68 is shaped so that a portion of the forward edge defines a cam surface 71 which extends tangentially from the bottom portion of the recess 48 to a point adjacent to the forward edge 50 of the latch plate 51. The cam surface 71 is positioned to the right of the recess 48, as the track switch is viewed in Figs. 1 and 2, and when the cam member 68 is shifted to the left, the cam surface 71 will move across the recess 48 and disengage the roller therefrom.

The cam member 68 is supported for movement from the position shown in Fig. 2, which permits the roller 44 to drop into the recess 48 to that indicated by dot-dash lines in Fig. 2 by a guide rod 73 mounted between the blocks 61, 64. The guide rod 73 for the cam member 68 passes through a boss 74 formed in a rearward extension 76 of the cam member 68. The cam member 68 also has a foot portion 75 depending from a forward edge of the cam member adjacent to the inner end thereof, which foot portion rides on the plate member 57. The boss 74, the foot portion 75 and the cam surface 71 may all be formed by appropriately bending the plate-like cam member 69.

When the cam member 68 is in the position shown in Fig. 2, it abuts the sleeve 62 which is received in a cutout portion 78 in the right-hand edge of the cam member. The sleeve 62 serves as a stop for the cam member 68 to limit its movement in one direction, and the block 61 serves as a stop to limit the outward or latch-releasing movement of the cam member, the block 61 being engaged by the boss 74 after the cam member has moved to the left, as viewed in the drawings, sufficiently to disengage the roller 44 from the recess 48.

The cam member 69 is of the same shape and construction as the cam member 68 but is of opposite hand and moves to the right, as viewed in the drawings, to disengage the roller 44 from the recess 52. The cam member 69 is formed with a cam surface 80 normally positioned to the left of the recess 52 and extending tangentially to the bottom portion thereof, a boss 81 through which the guide rod 73 passes, and a foot portion 82 which rides on the plate member 57. The cam member 69 is normally in a position abutting the sleeve 65 and is movable endwise therefrom to move the cam surface 80 across the recess 52 to disengage the roller 44 therefrom. The movement of the cam member 69 away from the sleeve 65 is limited by the engagement of the boss 81 with the block 64.

The cam members 68, 69 are urged to their normal positions by a spring 83 positioned above the latch plates 51, 54. The spring 83 has its opposite ends connected, respectively, to links 84, 85 which extend past the outer ends of the latch plates 51, 54, respectively, and are connected to the cam members 68, 69, respectively. The flexible pull members 40, 41, for shifting the inner frame assembly 25, are respectively connected to brackets connecting the links 84, 85 to the cam members 68, 69, respectively. It can, therefore, be seen that when a force is applied to either of the flexible pull members 40, 41, for example the pull member 40, the cam member connected thereto, in this case the cam member 68, is moved in its cam-releasing direction against the action of spring 83 and, after the roller 44 has been disengaged from the corresponding recess, the force applied to the pull member 40 is transmitted directly to the inner frame assembly 26 by reason of the engagement of the boss 74 with the block 61. If a force is applied to the flexible pull member 41 to shift the inner frame assembly to the right, the cam member 69 will first move to disengage the roller 44 and, upon engagement of the boss 81 with the block 64, the force applied to the pull cable 41 will be positively transmitted to the inner frame assembly 25.

It can now be seen that if the track switch is positioned as shown in Fig. 1 with the rail section 15 in alignment with the entering trackway 14 and the exit trackway 11, and it is desired to shift the switch so that the rail section 16 interconnects the entering trackway 14 and the exit trackway 12, the flexible member 40 is pulled to shift the inner frame assembly 25 to the left, as viewed in the drawings.

The initial movement of the flexible pull member 40 causes the cam member 68 to move to the left against the bias of spring 83. The movement of the cam member 68 causes the cam surface 71 to engage the roller 44 and move it from the recess 48 to permit the shifting movement of the frame in response to the force applied to the pull member 40. Preferably, the strength of the spring 83 is so related to the frictional forces that the inner frame assembly 25 will not move until the cam member 68 abuts the block 61 to cause the force applied to the pull member in the cam member 68 to be transmitted directly to the rest of the inner frame assembly. By proportioning the spring in this manner, the force necessary to move the cam member 68 through its latch releasing movement may be held to a minimum.

After the roller 44 has been disengaged from the recess 48, a continued pull on the flexible member 40 will cause the inner frame assembly to shift to the left, the roller 44 riding on the forward edges of the latch plates 51, 54. When the inner frame assembly has shifted to a position where the rail section 16 interconnects the entering trackway and the exit trackway 12, roller 44 will drop into the recess 50 to securely lock the inner frame assembly in its operative position with the rail section 16 in registry with the entering trackway 14. If the roller 44 is engaged in the recess 50 and it is desired to shift the inner frame assembly so that the rail section 15 is once again in alignment with the trackways 11, 14, the flexible member 41 is pulled and the cam member 69 is operated in a manner similar to the manner just described for the cam member 68 to disengage the roller 44 from the recess 50 and to permit the shifting of the inner frame assembly by a force applied to the pull member 41.

The force applied by the flexible pull members 40, 41 to shift the inner frame assembly 25 is in a direction parallel to the line of movement of the inner frame assembly and, therefore, the full component of the force is applied to shift the inner frame assembly 25. The full component of the force applied to the pull members 40, 41 is also utilized to shift the cam members 68, 69, respectively, against the action of spring 83 since the cam members 68, 69 move linearly along a line generally parallel to the direction of the force applied thereto.

While the cam members 68, 69 have been shown and described as, and preferably are, separate, individually movable cam members, the cam members could be connected to move as a unit in which case the force on the pull member would have to be released before the roller would engage the recess corresponding to the position to which the inner frame assembly is being moved.

From the foregoing, it may be seen that the objects heretofore enumerated have been accomplished and that the present invention provides a track switch which is readily shiftable between its various operative positions by the application of forces to flexible pull members and that the switch is so constructed and arranged that it is readily shiftable without the danger of fouling the flexible pull members and that the track switch is securely held in its immediate operative position by a latching mechanism which is released in response to a force applied to a pull member to shift the track switch from one of its positions to another.

While a preferred form of the invention has been described in considerable detail, it will be apparent that the invention is not limited to the construction shown or the uses referred to and it is my intention to cover hereby all adaptations, modifications, and changes which come within the practice of those skilled in the art to which the invention relates and the scope of the appended claims.

Having thus described my invention, I claim:

1. A track switch for an overhead monorail carrier system comprising a first frame, a second frame supporting said first frame for movement between a plurality of operative positions for registering in one direction of carrier travel an entering trackway leading into the switch with different ones of a plurality of exit trackways leading from the switch, latch means supported on one of said frames, abutment means on the other of said frames for receiving said latch means when said first frame is in any of said operative positions respectively to prevent movement of said first frame, first and second cam members supported on said first frame adjacent to said one of said means for movement with respect to said first frame, a first force transmitting member for shifting said first frame in one direction and operatively connected to said first cam member to move said first cam member in one direction upon operation of the first force transmitting member to shift the first frame, a second force transmitting member for shifting said first frame in a direction opposite to said one direction of movement of said first frame and operatively connected to said second cam member for moving said second cam member in one direction upon operation of the second force transmitting member to shift said first frame, said cam members each having a cam surface for disengaging the latch means from said abutment means upon movement of the cam member in its said one direction.

2. A track switch for an overhead monorail carrier system comprising a first frame, a second frame supporting said first frame for movement between a plurality of operative positions including first and second positions for registering in one direction of carrier travel an entering trackway leading into the switch with different ones of a plurality of exit trackways leading from the switch, a latch member supported by one of said frames, means defining first and second abutment means on the other of said frames for receiving said latch member when said first frame is in its first and second positions respectively to prevent movement of said first frame, first and second cam members adjacent to said first and second abutment means, a guide member on said first frame supporting said cam members for linear movement parallel to the movement of said first frame, a first flexible pull member operatively connected to said first frame for shifting said first frame in the direction of movement when proceeding from said first position to said second position, means operatively connecting said first flexible pull member to said first cam member to apply a force to the latter parallel to said guide member to move said first cam member in one direction upon operation of the pull member to shift the first frame, a second flexible pull member operatively connected to said first frame for shifting said first frame in the direction of movement when proceeding from said second position to said first position, means operatively connecting said second flexible pull member to said second cam member for moving said second cam member in one direction upon operation of the flexible pull member to shift said first frame, spring means for urging said cam members in directions opposite to their direction of movement by their respective pull members, said cam members each having a cam surface for disengaging the latch member from a respective one of said abutment means upon movement of the cam member from the position to which the latter is urged by said spring means upon operation of the corresponding force transmitting member to shift the said first frame, and stop means engageable by each of said cam members upon completion of its movement in their said one direction to release said latch member.

3. An overhead monorail carrier system having in combination therewith a track switch comprising a first frame, a second frame supporting said first frame for horizontal shifting movement between a plurality of operative positions including first and second end positions for selectively positioning in one direction of carrier travel an entering trackway leading into the switch with different ones of a plurality of trackways leading from the switch, a recessed member having a side extending parallel to the line of first movement of said first frame, means fixedly connecting said recessed member to one of said frames, a latch member adapted to ride against said side, means on the other of said frames supporting said latch member adjacent to said side and yieldably urging said latch member into engagement therewith, said side having a plurality of spaced recesses therein for individually receiving said latch member, each of said recesses corresponding to a respective one of said operative positions and said latch member being received therein when said first frame is in the respective operative position to prevent movement of said first frame therefrom, force transmitting means for shifting said frame between said first and second operative positions, means operatively connecting said force transmitting means to said first frame including cam means slidably supported on said first frame and actuated in response to a force applied to said force transmitting means for disengaging said latch member from the recess corresponding to the operative position away from which said frame is being moved by the force transmitting means, and stop means for limiting the movement of said cam means and engageable by the latter upon completion of the movement of said cam means to release said latch member.

4. A track switch for an overhead monorail carrier system comprising a first frame, a second frame supporting said first frame for movement between a plurality of operative positions including first and second positions for registering in one direction of carrier travel an entering trackway leading into the switch with different ones of a plurality of exit trackways leading from the switch, a latch member supported by one of said frames for preventing movement of said first frame, means on the other of said frames defining a member having first and second recesses therein for respectively receiving said latch member when said first frame is respectively in said first and second positions to prevent movement of said first frame, means urging said latch member into engagement with said member having said first and second recesses, first and second movable members supported on said first frame for limited linear movement parallel to the direction of movement of said first frame adjacent to said first and second recesses, a first force transmitting member operatively connected to said first frame and operable to shift said first frame in the direction proceeding from said first position to the second position, means operatively connecting said first force transmitting member to said first movable member to move said first movable member in one direction upon operation of the force transmitting member to shift the first frame, a second force transmitting member operatively connected to said first frame for shifting said first frame in the direction proceeding from said second position to said first position, means operatively connecting said second force transmitting member to said second movable member for moving said second movable member in one direction upon operation of the force transmitting member to shift said first frame, spring means for urging said movable members in directions opposite to their direction of movement by their respective force transmitting members, said movable members each having a cam surface for disengaging the latch member from a respective one of said recesses upon movement of the movable member from the position to which the latter is urged by the spring means upon operation of the corresponding force transmitting member to shift the said first frame.

5. A track switch for an overhead monorail carrier system comprising a first frame, a second frame supporting said first frame for movement between a plurality of operative positions including first and second positions for selectively registering in one direction of carrier travel an entering trackway leading into the switch with different ones of a plurality of exiting trackways leading from the switch, a latch member movably supported adjacent to said first frame for preventing movement thereof, means defining a member having first and second recesses therein spaced in the direction of movement of said first frame for respectively receiving said latch member to prevent movement of said first frame when said first frame is respectively in said first and second positions, means urging said latch member into engagement with said member having said first and second recesses, first and second movable members, a guide member on said first frame extending parallel to the direction of movement thereof and supporting said movable members for limited linear movement parallel to the direction of movement of said first frame, a first flexible pull member operatively connected to said first frame for moving said first frame in the direction proceeding from said first position to the second position, means connecting said first pull member to said first movable member to move said first movable member in one direction along said guide member upon operation of the first pull member to move the first frame, a second flexible pull member operatively connected to said first frame for moving said first frame in the direction proceeding from said second position to said first position, means connecting said second flexible pull member to said second movable member for moving said second movable member in one direction upon operation of the second pull member to move said first frame, a spring connected between said movable members for urging said movable members in directions opposite to their direction of movement by their pull members, said movable members each having a cam surface for disengaging the latch member from the adjacent recess upon movement of the movable member from the position to which the latter is urged by said spring means upon operation of the corresponding pull member.

References Cited in the file of this patent

UNITED STATES PATENTS

| | | |
|---|---|---|
| 1,379,614 | Bennington | May 31, 1921 |
| 1,632,557 | Moon | June 14, 1927 |
| 1,678,618 | Preston | July 24, 1928 |
| 2,138,962 | Forker | Dec. 6, 1938 |
| 2,526,819 | Henderson | Oct. 24, 1950 |
| 2,651,714 | Poole | Sept. 8, 1953 |

FOREIGN PATENTS

| | | |
|---|---|---|
| 923,618 | France | Feb. 24, 1947 |